US006058036A

United States Patent [19]

Endo et al.

[11] Patent Number: 6,058,036

[45] Date of Patent: May 2, 2000

[54] INVERTER APPARATUS HAVING OPERATION SPECIFICATIONS DETERMINED BY TYPE OF I/O BLOCK WHICH IS CONNECTED TO BASIC CONTROL UNIT

[75] Inventors: Tsunehiro Endo, Narashino; Seiji Ishida, Funabashi; Kenji Nandoh, Matsudo; Tadao Shimotsu, Sakura; Hiroyuki Benya, Narashino, all of Japan

[73] Assignee: Hitachi, Ltd., Tokyo, Japan

[21] Appl. No.: 08/988,906

[22] Filed: Dec. 11, 1997

[30] Foreign Application Priority Data

Dec. 26, 1996 [JP] Japan .................................... 8-348289

[51] Int. Cl.[7] ...................................................... H02M 3/24

[52] U.S. Cl. ............................................................... 363/98

[58] Field of Search ................................ 363/97, 98, 131, 363/132, 37, 56

[56] References Cited

U.S. PATENT DOCUMENTS 5,574,352 11/1996 Endo et al. ............................. 318/802

FOREIGN PATENT DOCUMENTS 2-211039 8/1990 Japan .

*Primary Examiner*—Shawn Riley

*Attorney, Agent, or Firm*—Antonelli, Terry, Stout & Kraus, LLP.

[57] ABSTRACT

An inverter apparatus includes a basic control section including a main circuit which includes an inverter, and a control unit which controls the main circuit. The inverter apparatus also includes an I/O block which is connected to the basic control section, and is selected from a plurality of different types of I/O blocks. The I/O block includes an input/output interface. The input/output interface includes a signal connection terminal which transmits an input/output signal to/from the control unit. Operation management specifications of the main circuit are fixed independently of operation management specifications of the input/output interface. Operation specifications of the inverter apparatus change depending on the operation management specifications of the input/output interface, and are determined by the type of the I/O block which is connected to the basic control section, such that connecting the different types of I/O blocks to the basic control section causes the inverter apparatus to have different operation specifications.

12 Claims, 7 Drawing Sheets

INVERTER APPARATUS HAVING OPERATION SPECIFICATIONS DETERMINED BY TYPE OF I/O BLOCK WHICH IS CONNECTED TO BASIC CONTROL UNIT

BACKGROUND OF THE INVENTION

The present invention relates to an inverter apparatus adaptable to different specifications, and more particularly to a general-purpose inverter apparatus suitable for driving an induction motor.

Inverter apparatuses capable of controlling the start-up and variable speed operation of an induction motor have widely been used in various applications. To this end, different inverters having various performance and functions depending on various applications have been provided.

Generally shown in FIG. 7, a conventional general-use inverter apparatus is provided with a main circuit 2 which is supplied with three-phase AC power RST via a terminal block 26 from an AC power source 1 and converts the AC power RST to a required variable-frequency variable-voltage three-phase AC power UVW which is then supplied via a terminal block 27 to an induction motor 3 for variable speed driving.

To this end, first, the main circuit 2 is provided with an AC-DC converter 21, a capacitor 22 which smooths a DC voltage from the converter 21, an inverter 23 as a DC-AC converter, a thermistor 24 which senses the temperature of semiconductor elements of the main circuit, and a resistor 25 which senses a main circuit current.

A power supply/sensor unit 4 is provided with a power supply 41 which produces various DC voltages; a sensor unit composed of a current sensor 42 and a voltage sensor 44 which sense a current and a voltage, respectively, in and across the main circuit, and a temperature sensor 45; and a driver 43 which supplies the inverter 23 with a drive signal.

A control/input-output unit 5 is provided with a microcomputer 51 as a main element, a storage unit 52, an operator 56 which acts as an input/output interface, an input circuit 54 and an output circuit 55 which each include a signal connection terminal connected via an isolator unit 53, which includes a photo coupler which provides electrical isolation, using optical signal transmission, as shown.

Thus, the user is able to control the inverter apparatus, using the operator 56 or an external controller connected via the input circuit 54 and the output circuit 55. To this end, the operator 56 is provided with a display unit and an input panel, as shown.

The microcomputer 51 controls the operation of the inverter 23 on the basis of signals from the input circuit 54 and/or the operator 56 in accordance with programs stored therein. The contents of the control by the microcomputer 51 are, for example, determination of an output frequency, and/or voltage generation of a drive signal, and selection of an operation system.

In addition, the contents of the control include processing required for performing a protective operation in accordance with signals from various sensors such as the current sensor 42, voltage sensor 44 and temperature sensor 45; and outputting data which includes the frequency, direction of rotation and current at that time, a factor of protection which has caused the protective operation, if any, to an external controller via the operator 56 and the output circuit 55 and displaying the data.

The operator 56 is mounted on a baseplate of the control/input-output unit 5 or may be set at a position separated from the inverter body. Japanese Patent Application Laid-Open No. JP-A-02-211039 discloses an electric motor which contains a main circuit such as an inverter device with its controller being separated from the main circuit.

This prior art is directed to a servo motor which contains a pack module of a power device, a base driver as its peripheral unit, and a current sensing system. The controller is provided with a control unit with the interfacing between the motor and controller being performed with optical signal transmission.

The above prior art fails to take into consideration diversification of specifications under common use of the main portion of the inverter device, and it is difficult to expand the wide usability of the inverter device sufficiently.

For example, in the conventional inverter apparatus of FIG. 7, the microcomputer 51 controls both the input/output interface and the main circuit 2 of the inverter 23.

The control of the main circuit 2 is inherent in the inverter and not dependent on a customer's requirements.

The control of the input/output interface varies in content depending on a customer's requirement. Thus, when the functions and performance as standard specifications prepared by a manufacturer do not satisfy the customer's requirements, a change of software for the microcomputer, or up to the operator 56 or the input circuit 54 and output circuit 55, are required to be changed as the case may be.

Thus, re-creation of the software for the microcomputer and/or hardware as the input/output interface of the microcomputer may be required depending on the customer's requirements.

In the conventional techniques, the input and output circuits are fixed to the inverter body, so that they cannot be separated from other elements. Thus, the main circuit 2 and the input and output circuits 54 and 55 therefor are provided inevitably in the same place.

The conventional technique of JP-A-02-211039 discloses the use of a main circuit varying depending on the capacity of the electric motor, and the use of the controller as a common element separated from the main circuit. It discloses the technique for separating a power unit and its peripheral unit from a control unit in the controller. Although the conventional technique discloses the control unit side as a new controller which includes the power unit, its peripheral unit and their interfaces, it fails to consider an input/output from/to an external unit to/from the new controller.

SUMMARY OF THE INVENTION

It is an object of the present invention to provide an inverter device adaptable to changes of various specifications.

The above object is achieve by an inverter apparatus comprising a main circuit which includes at least an inverter, a control unit which controls the main circuit, and an input/output interface having a signal connection terminal which transmits an input/output signal to/from the control unit, wherein a section comprising at least the main circuit and the control unit is separated from a section comprising the input/output interface; the section comprising the main circuit and the control unit is a basic inverter section; the section which comprises the input/output interface is an I/O circuit block, the I/O circuit block being connected with the basic inverter section; and operation specifications of the inverter device are set depending on a type of the connected I/O block.

According to the present invention, the input/output interface is controlled separately from the main circuit of the inverter and the performance and functions of the inverter are changed depending on the type of the connected I/O circuit block.

According to the present invention, the specifications of the inverter which the customer requires are realized by only changing the I/O block and using the basic inverter section as it is.

According to the present invention corresponding to a predetermined embodiment, signal transmission between the basic inverter section and the I/O circuit block is performed by serial communication. Set frequency data is transmitted from at least the I/O circuit block to the basic inverter section whereas electric current data is transmitted from the basic inverter section to the I/O block. As just described above, when the signal transmission between the I/O block and the basic inverter section is performed by serial communication, the number of signal connection lines is reduced, and separate installation of the I/O block and the basic inverter section is facilitated.

DESCRIPTION OF THE PREFERRED EMBODIMENTS

Now, a preferred embodiment of an inverter apparatus according to the present invention will be described with respect to the accompanying drawings.

Figure 1:
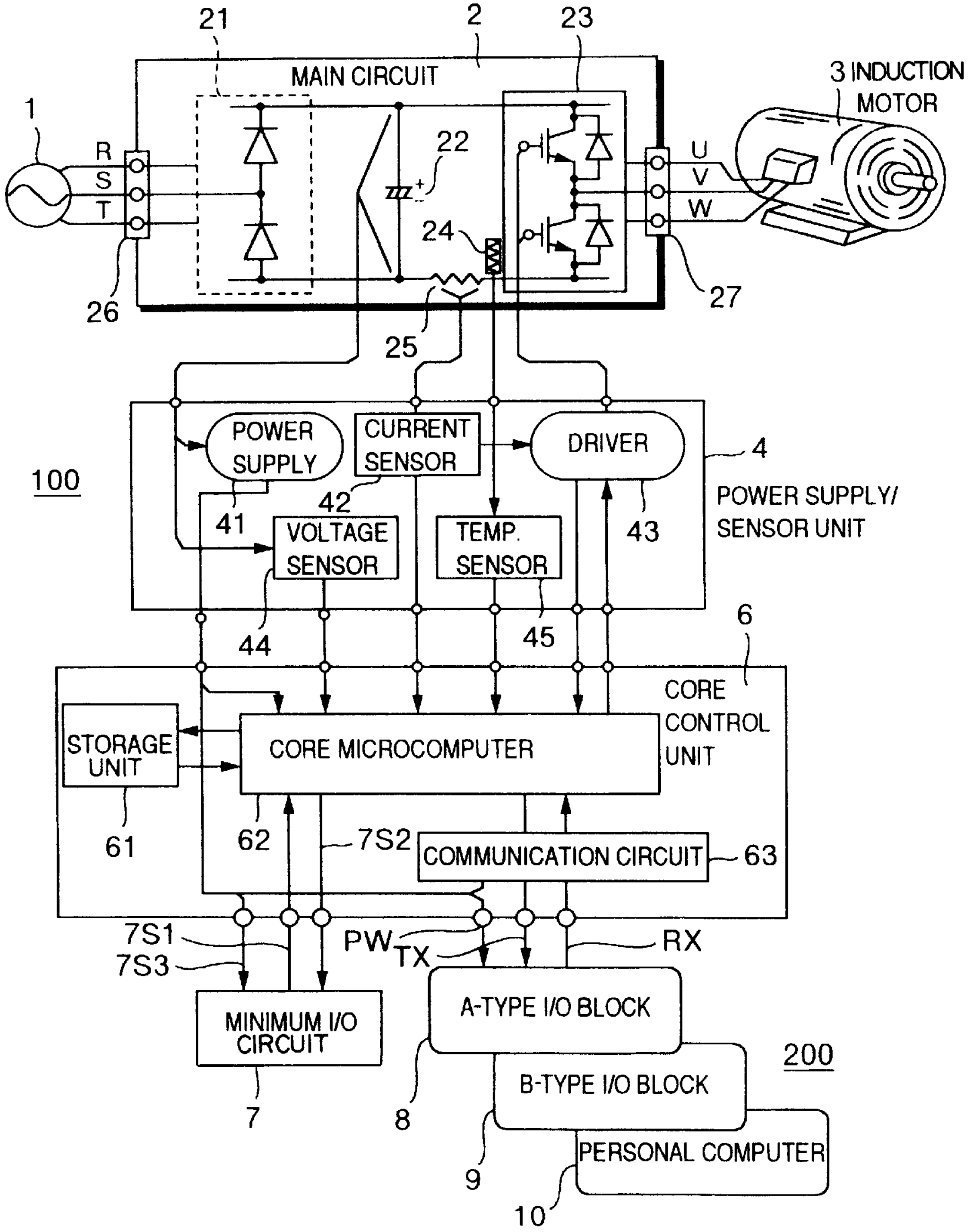
FIG. 1 is a block diagram of one embodiment of an inverter apparatus according to the present invention.
Figure 7:
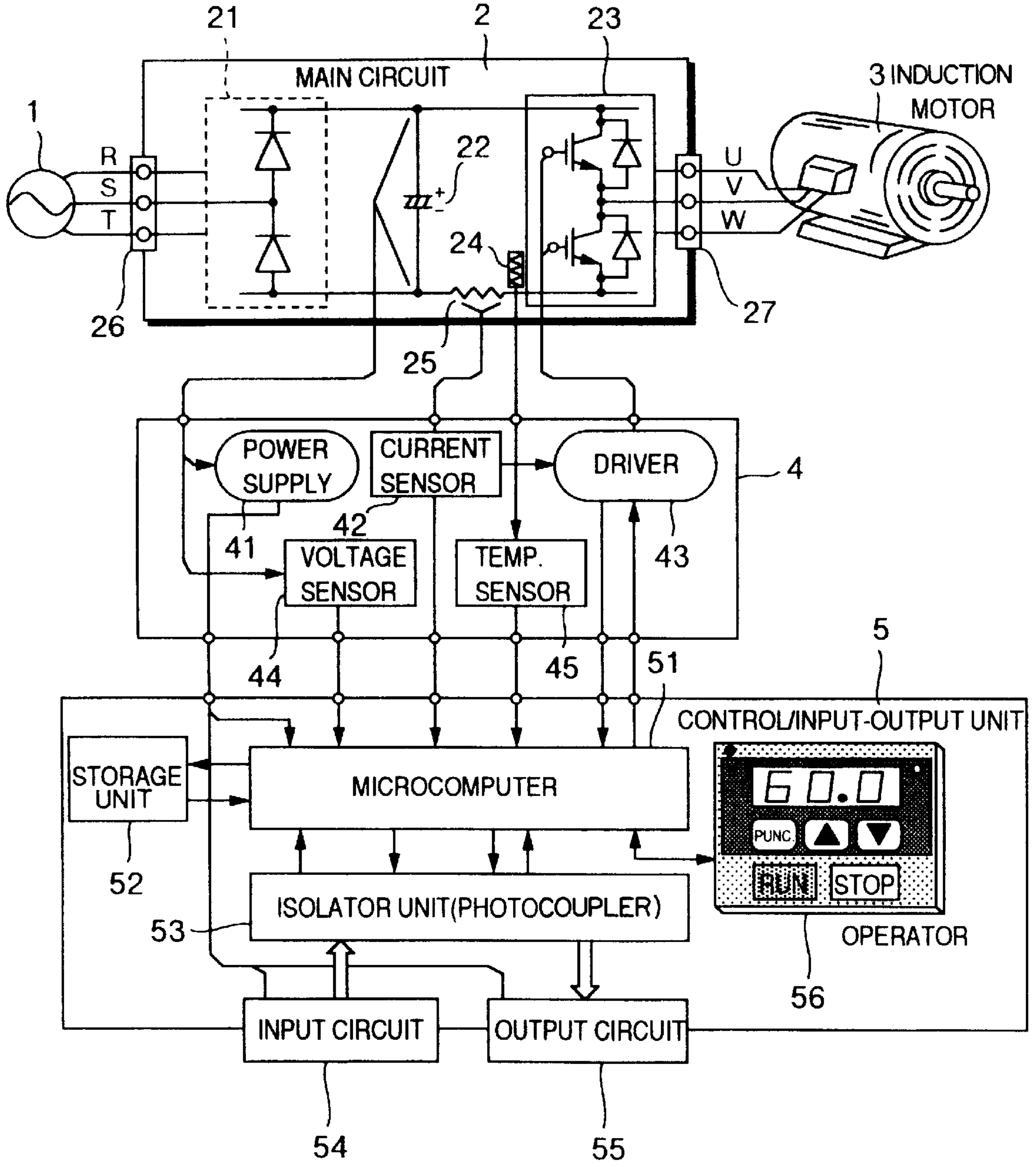
FIG. 7 is a block diagram of a conventional inverter control device.

FIG. 1 is a block diagram of a whole embodiment of the inverter system according to the present invention in which an AC power supply 1, a main circuit 2, an induction motor 3, and a power supply/sensor unit 4 are the same as the corresponding ones of the conventional inverter of FIG. 7, as described above. The main circuit 2 receives three-phase AC power RST via a terminal block 26 from the AC power supply 1, converts the AC power RST to a required variable-frequency variable-voltage three-phase AC power UVW, supplies the same to the induction motor 3 via a terminal block 27 to drive the same at a variable speed, which is also the same as the conventional inverter operation.

The main circuit 2 is provided with a converter 21, a smoothing capacitor 22, an inverter 23, a temperature sensing thermistor 24, and a resistor 25. Thus, the main circuit 2 is also the same as the conventional main circuit. The power supply/sensor unit 4 is provided with a power supply 41; a sensor unit which is composed of a current sensor 42, a voltage sensor 44, and a temperature sensor 45; and a driver 43 which supplies a drive signal to the inverter 23. Thus, the power supply/sensor unit 4 is also the same as the conventional power supply/sensor unit.

In the embodiment of the inverter system of FIG. 1, a core control unit 6 is used instead of the control/input-output unit 5 of the conventional inverter of FIG. 7. Thus, the basic inverter section 100 is provided with the main circuit 2, power supply/sensor unit 4, and core control unit 6. The inverter system is provided with the basic inverter section 100; and any selected one of different I/O blocks 200 which are, for example, an A-type I/O block 8, a B-type I/O block 9 and a personal computer 10, as units separated from the basic inverter section 100. This composition of the inventive inverter system is greatly different from that of the conventional inverter of FIG. 7.

The core control unit 6 is connected with a minimum I/O circuit 7 for parallel signal transmission and an I/O block (in FIG. 1, A-type I/O block 8, B-type I/O block 9 and personal computer 10) for serial signal communication.

The core control unit 6 is composed of a core microcomputer 62, a storage unit 61, and a communication circuit 63 and is connected with any one of the I/O blocks 8, 9 and personal computer 10 via the communication circuit 63 for transmission of a send signal TX and a receive signal RX. At this time, the power supply 41 supplies power PW to the selected I/O block.

In addition to any one of the I/O blocks 8, 9 or personal computer 10, the core control unit 6 is also connected with the minimum I/O circuit 7, which is generally one of the I/O blocks, and is connected directly with the core microcomputer 62, and not via the communication circuit 63, for communication purposes. One of signals used in this case is an input signal 7S1 and the other is an output signal 7S2. The power supply 41 supplies power 7S3 to the core microcomputer 62 and minimum I/O circuit 7.

Figure 2:
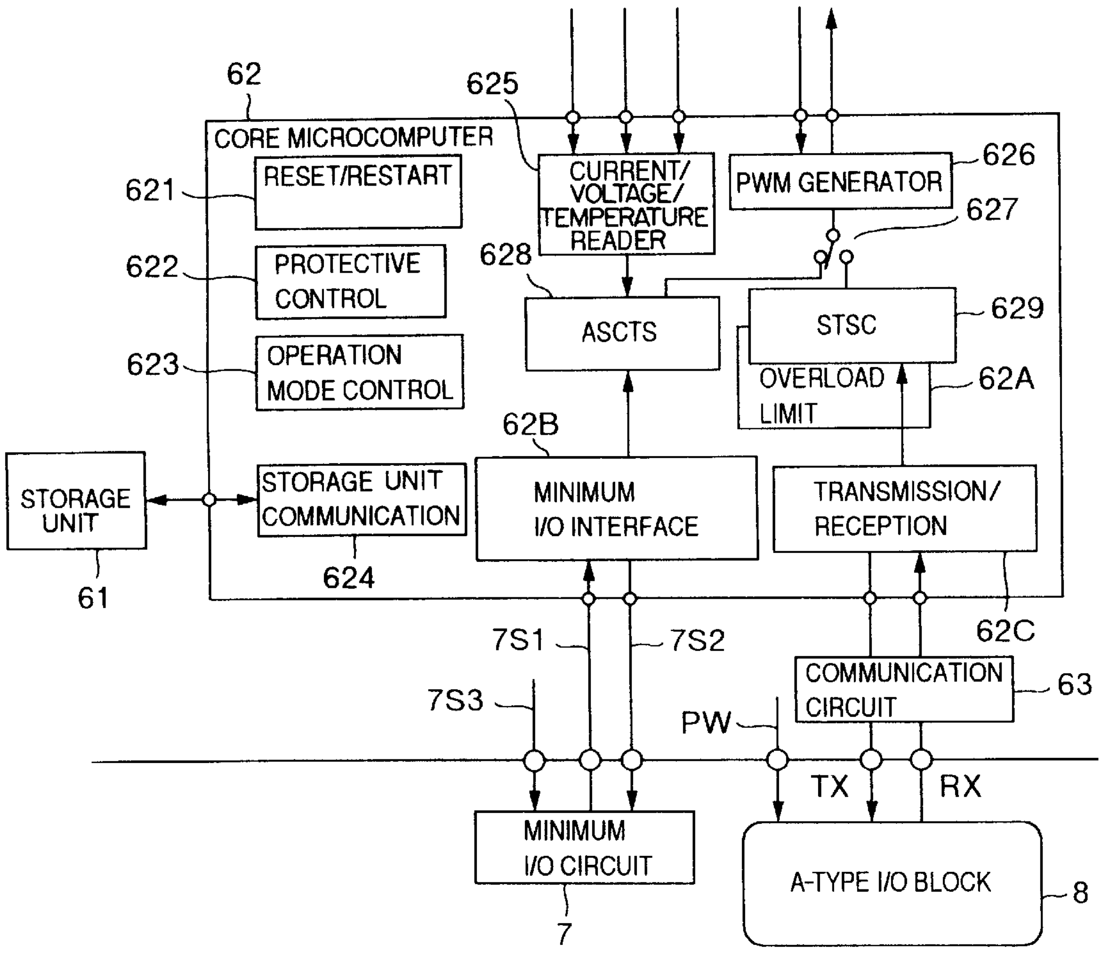
FIG. 2 is a block diagram of the contents of a process performed by a microcomputer of the embodiment.

The operation of the embodiment will be described next. The respective contents of processing functions fulfilled by the core microcomputer 62 are shown in blocks in FIG. 2.

They are a reset/restart unit 621 operating when the power supply is turned on or a program is restarted, a protective control unit 622 operating when an overcurrent or overvoltage is generated, an operation mode control unit 623 which controls the operation mode of the inverter 23, a storage unit communication unit 624 which communicates with the storage unit 61, a current/voltage/temperature reader unit 625 which reads a current, voltage and temperature from the power supply/sensor unit 4, and a PWM generator unit 626 which generates a signal to drive switching elements (the IGBT (insulated gate bipolar transistors) shown by the symbols in FIG. 1) of the inverter 23 via the driver 43.

In order to gradually increase/decrease the output frequency and output voltage of the inverter 23 to increase/decrease the speed of the induction motor 3, there are provided an automatic speed changing time setting (ASCTS) unit 628, a set time speed changing (STSC) unit 629, and a software switch 627 which selects one of the changing units 628 and 629.

The automatic speed changing time determining unit 628 automatically determines a speed changing time so that no overcurrent/overvoltage is generated. The set time speed changing unit 629 uses an I/O block, for example the A-type I/O block 8, to increase/decrease the induction motor 3 for the speed increasing/decreasing time set by the user.

The core microcomputer 62 includes a minimum I/O interface 62B which controls an input/output to/from the minimum I/O circuit 7, and a transmission/reception unit 62C which inputs/outputs signals to/from one of the I/O blocks (in FIG. 2, the A-type I/O block 8) via the communication circuit 63. The transmission/reception unit 62C uses a transmission/reception circuit built in the core microcomputer 62.

Figure 3:
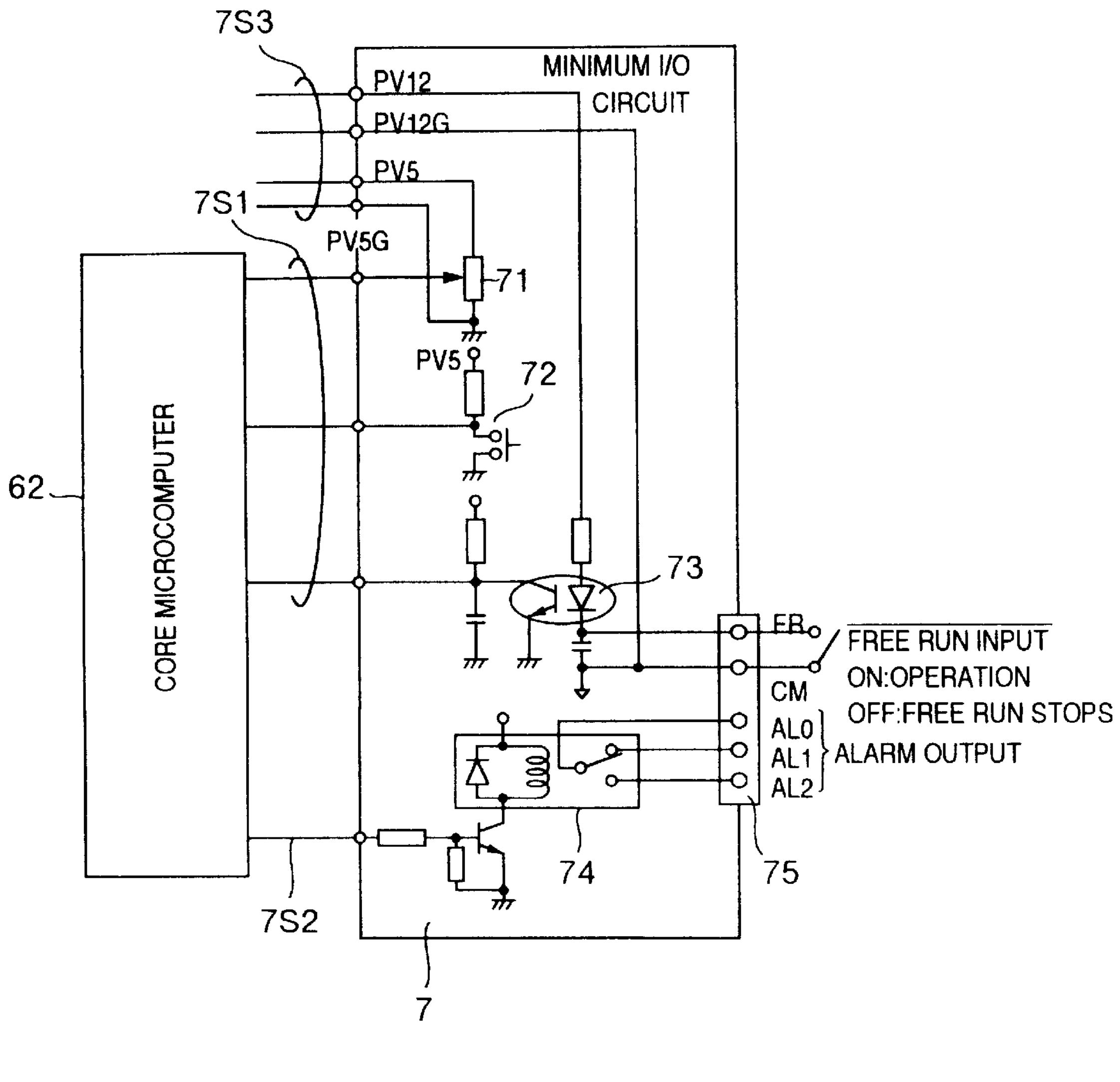
FIG. 3 is a detailed schematic of an essential portion of a minimum I/O circuit of the embodiment.

FIG. 3 shows the composition of the minimum I/O circuit 7, which is one of the I/O blocks and is constructed so as to transmit/receive a signal directly in a parallel form to/from the core microcomputer 62 without using the communication circuit 63 as an intermediary means.

The signal 7S1 inputted from the minimum I/O circuit 7 to the core microcomputer 62 includes three kinds of signals; that is, a specified frequency from a control (variable resistor) 71, an operation start/stop and reset signal from a pushbutton switch 72, and a free run signal which is information regarding weather terminals FR and CM of the terminal block 75 are connected together and is inputted via a photocoupler 73. To this end, the minimum I/O circuit 7 is supplied with two kinds of power 7S3 (PV12, PV12G; PV5, PV5G) from the power supply/sensor unit 4 via the core control unit 6.

A signal 7S2 outputted from the core microcomputer 62 is for operating an IC relay 74 to send an alarm output from the inverter device to the outside via terminals AL0, AL1, AL2 of the terminal block 75 when the operation of the inverter 23 is stopped due to an overcurrent or overvoltage.

The operation of the minimum I/O circuit 7 will be described next. As is obvious from FIG. 2, the minimum I/O circuit 7 is connected with the automatic speed changing time determining unit 628 via the minimum I/O interface 62B of the core microcomputer 62.

The minimum I/O circuit 7 is provided to operate at least the inverter and to provide an alarm output to the outside even when any other block 8, 9 or 10 is not connected with the core control unit 6.

Thus, when only the minimum I/O circuit 7 is connected with the core control unit 6, or when no communication is performed between the core microcomputer 62 and any other particular one of the I/O blocks 8–9 even after the particular I/O block is connected with the core microcomputer 62, the minimum I/O circuit 7 operates the automatic speed changing time determining unit 628.

When the terminals FR and CM are open, the start/stop of the inverter is controlled only by pushing a single push button switch 72. At this time, the output frequency of the inverter 23 is adjusted by the control 71. Thus, if the push button switch 72 is pushed when the inverter is at a stop, the inverter 23 is started up so that the automatic speed changing time determining unit 628 increases the output frequency automatically with a predetermined change rate up to the frequency set by the control 71. At this time, the output voltage of the inverter 23 is controlled depending on the output frequency, for example, in a manner where V/F is constant.

If the pushbutton switch 72 is pushed during while the inverter is operating, the automatic speed changing time determining unit 628 decreases the output frequency of the inverter 23 automatically down to approximately 0 Hz to stop the inverter 23. Also, at this time, the output voltage of the inverter 23 is controlled depending on the output frequency, for example, in a manner where V/F is constant.

When the control 71 is operated during the operation of the induction motor, and the specified frequency is changed, the automatic speed changing time determining unit 628 automatically increases/decreases the speed (frequency) of the motor until a new output frequency is obtained.

On the other hand, when an alarm is output, it is reset by pushing the pushbutton switch 72 and the drive of the induction motor begins to operate again.

Next, when the terminals FR and CM are connected together, the induction motor is accelerated automatically up to the frequency set by the control 71. When the connection of the terminals FR and CM is then opened, the drive of the inverter 23 is immediately stopped and the inverter becomes opened-state so called free run stopping control.

Figure 4:
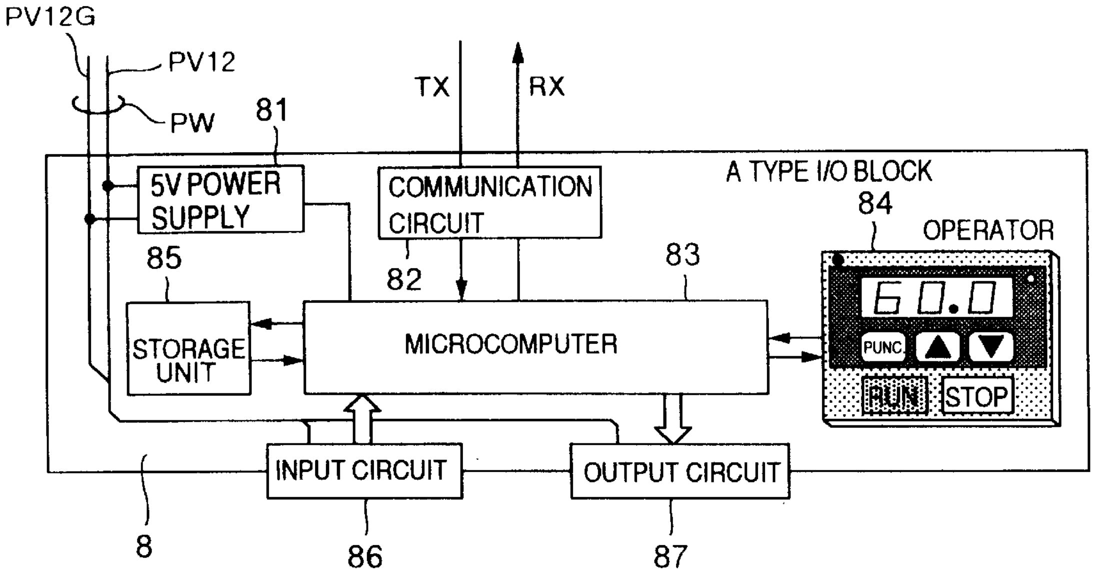
FIG. 4 is a detailed schematic of an essential portion of an I/O block of the embodiment.

Next, A I/O blocks 8 and 9 and personal computer 10 will be explained. First, FIG. 4 shows the composition of the A-type I/O block B. As shown, the A-type I/O block 8 is composed of a 5V (5 volts) power supply 81 which is supplied with 12V (12 volts) power (PV12-PV12G) to produce 5V power, a communication circuit 82 for communication with the core microcomputer 62 side, a microcomputer 83, an operator 84, a storage unit 85, an input circuit 86 and an output circuit 87 for communication with a device outside the inverter.

At least the input circuit 86 is different from the conventional input circuit 54 of FIG. 7, and is connected directly to the microcomputer 83 without using an intermediary circuit such as the isolator unit 53.

As shown, the operator 84 includes a display unit and an input panel. Thus, the operating frequency and the current flowing through the induction motor 3 are displayed. Various operation data such as a set frequency, an acceleration time, a deceleration time, an inverter output voltage, an operation stop instruction, and data for connection/disconnection of an input circuit 86 and an output circuit 87 with/from the microcomputer 83 are inputtable.

The microcomputer 83 mainly executes an may be inputted process and an output process. First of all, in the input process, the microcomputer 83 gets input signals from the operator 84 and the input circuit 86, converts the input signals to serial data and sends the serial data as a receive signal RX to the core microcomputer 62.

For instance, if a set frequency is inputted from the operator 84 or the input circuit 86, it is then inputted to the microcomputer 83, which converts the set frequency to serial data. This data is then transmitted to the core microcomputer 62, which drives the inverter 23 so that its frequency reaches the set frequency.

Next, in the output process of the microcomputer 83, the I/O block gets the serial data TX transmitted by the core microcomputer 62 via the communication circuit 82, converts this data to parallel data, displays the same on the operator 84 and outputs the parallel data to the outside from the inverter system via the output circuit 87.

For instance, the current flowing through the induction motor 3 and the inverter output frequency at that time are converted to serial data by the core microcomputer 62, and the serial data is fetched by the microcomputer 83 via communication circuits 63 and 82.

This data is converted by the microcomputer 83 to parallel data, which is then displayed on the operator 84 and outputted from the inverter system via the output circuit 87.

Next, the B-type I/O block 9 will be explained. This has basically the same composition as the A-type I/O block 8 in FIG. 4, but is different from the A-type I/O block 8 in the specifications of the operator 84 and the contents of processing by the microcomputer 83.

This also applies to the personal computer 10, which provides the same function as the A-type I/O block 8, using its display unit and input device such as a keyboard, although the personal computer 10 is different in specification from that of the A type I/O block 8.

Therefore, an inverter system of any specifications can be obtained by selecting an I/O block 200 which should be connected with the core control unit 6 without changing the basic inverter section 100.

Figure 5:
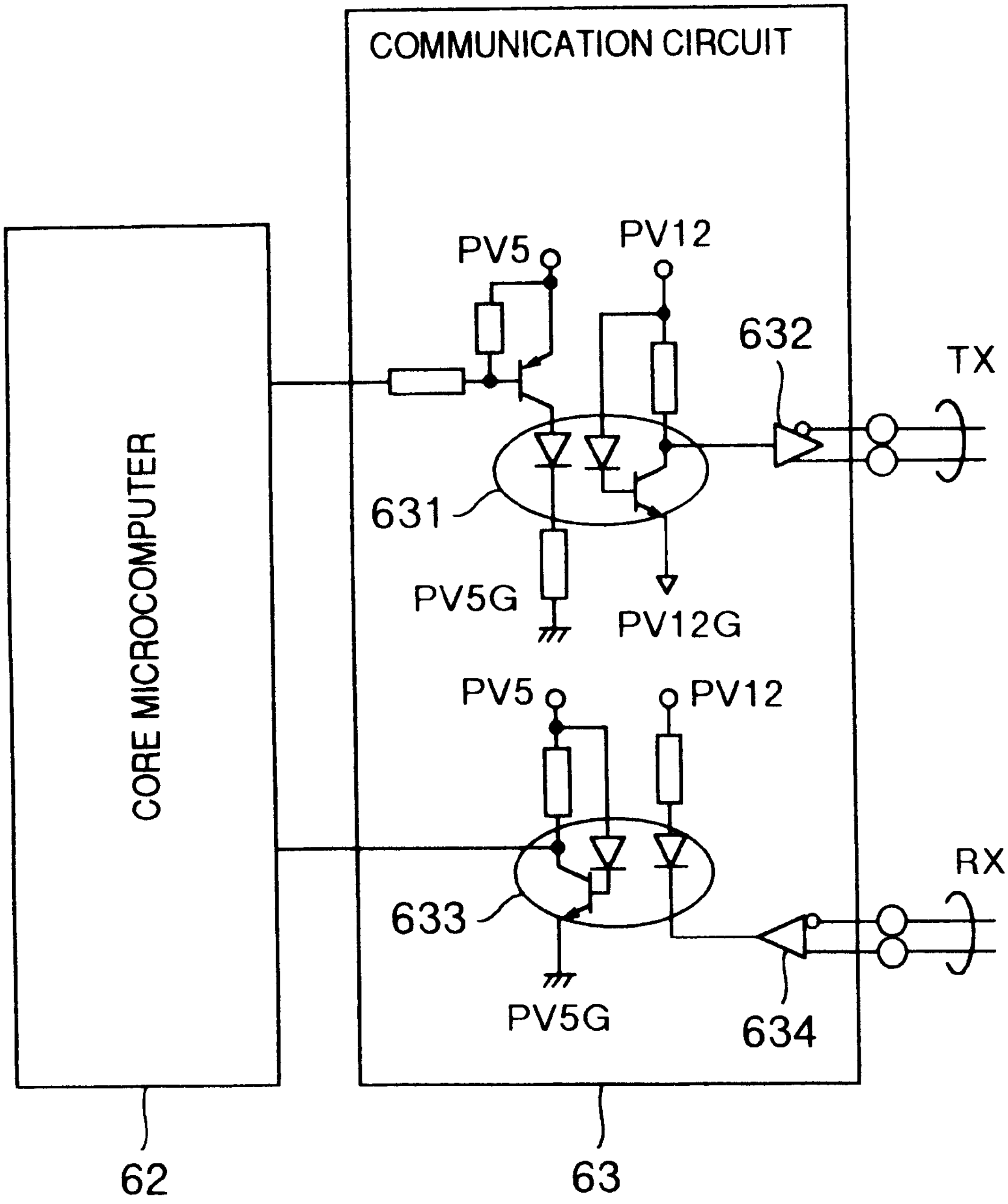
FIG. 5 is a detailed schematic of an essential portion of a communication circuit of the embodiment.

FIG. 5 shows the composition of the communication circuit 63 in the core control unit 6. The communication circuit 63 is provided with a pair of photocouplers 631,633 which operate with power supplies PV5, PV5G, PV12, and PV12G supplied by the power supply circuit 41 of the power supply/sensor unit 4; a driver IC 632; and a receiver IC 634.

Serial transmit data TX which should be sent from the core microcomputer 62 to the outside is inputted to the communication circuit 63 via transmission/reception unit 62C. The serial transmit data TX is transmitted through the photocoupler 631 and the driver IC 632 to an external I/O block, i.e., A-type I/O block 8. The photocoupler 631 provides electrical isolation between the microcomputer 62 and the external I/O block.

Serial receive data RX sent from the external A-type I/O block is transmitted through the receiver IC 634 and photocoupler 633 to the transmission/reception unit 62C of the core microcomputer 62. The photocoupler 633 provides electrical isolation between the external I/O block and the core microcomputer 62.

As a result, the I/O block side and the core control unit 6 are electrically isolated by the two photocouplers 631 and 633, and the input and output circuits, for example, designated by 86 and 87, respectively, of the I/O block 200 are not required to be electrically isolated from devices outside the inverter system.

Next, the beneficial effects of the particular embodiment will be explained. First of all, the features of the particular embodiment are that the inverter system includes two kinds of I/O blocks (in a wide sense) as the I/O block 200 for the basic inverter section 100 composed of the main circuit 2, power supply 1 sensor unit 4, and core control unit 6.

One of those I/O blocks is a minimum I/O circuit 7 which handles parallel data, and the other is an I/O block (A-type I/O block 8, B-type I/O block 9, personal computer 10) which handles serial data.

As a result, for the A and B type I/O blocks 8 and 9, ones are prepared which are different in the specifications of the operator 84 and the contents of processing by the microcomputer 83.

For the personal computer 10, one is prepared which provides the same function as the A-type I/O block 8, using its display unit and input device such as a keyboard, although the personal computer 10 is different in specification from that of the A-type I/O block 8. By selecting any one from among the prepared I/O blocks and personal computer, and connecting the selected one with the core control unit 6, an inverter system having any specifications is obtained without changing the basic inverter section 100.

Thus, according to the particular embodiment, an inverter system of any specifications is easily and simply obtained. Therefore, inverter systems of low cost are provided which satisfy various demands of different customers.

Since in the particular embodiment signals are transmitted in serial communication between the basic inverter section 100 and the I/O block 200, a general personal computer and the basic inverter section 100 are connectable. Thus, even if no new hardware for the I/O block is developed, an inverter system can be realized only by developing software for the personal computer.

As a result, since the basic inverter section 100 and the I/O block 200 are providable separately and the number of signal connection lines is decreased, they are more easily provided separately, which increases the degree of freedom of installation.

Figure 6:
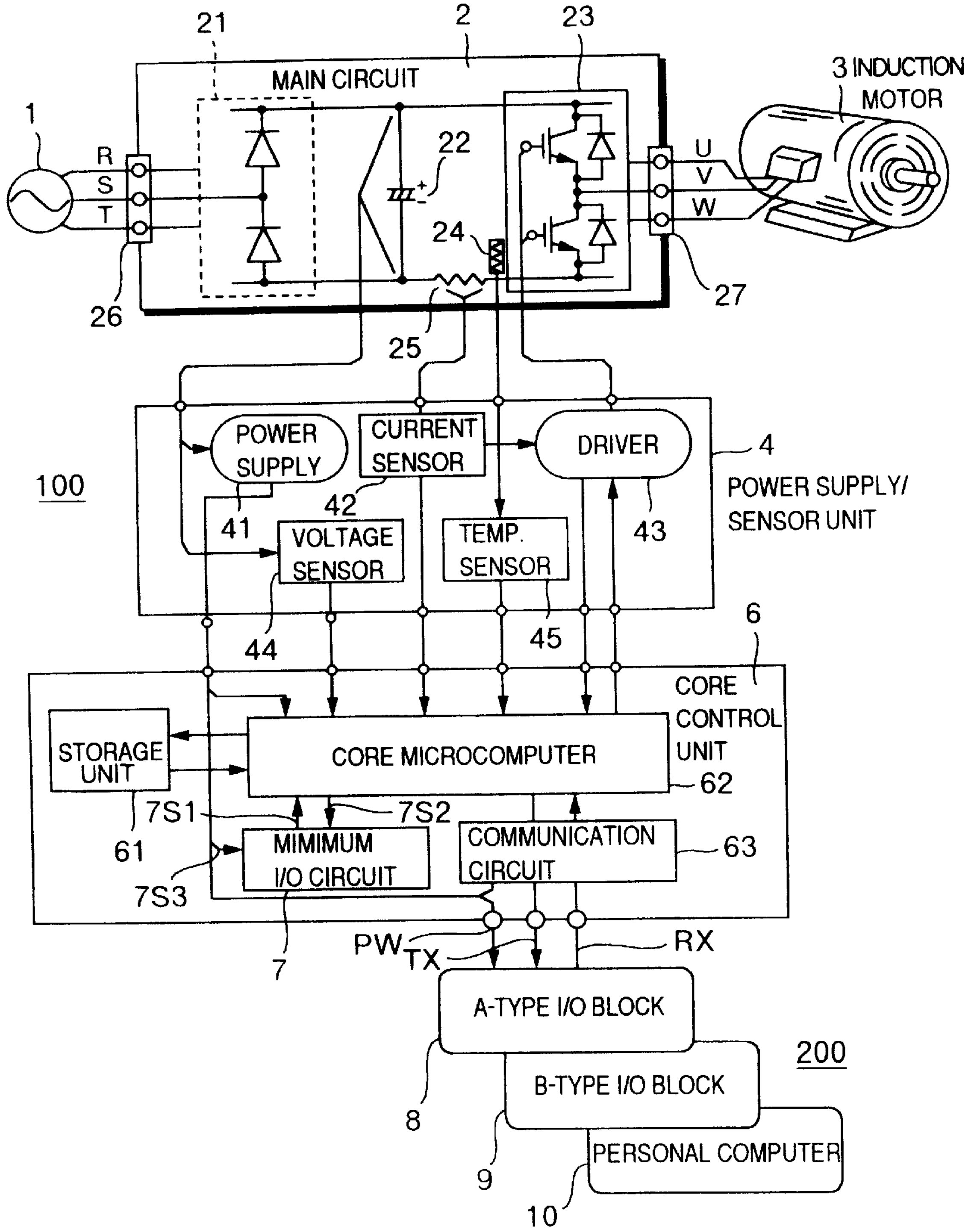
FIG. 6 is a block diagram of another embodiment of the inverter apparatus according to the present invention.

FIG. 6 shows another embodiment of the inverter system according to the present invention which is the same in composition as the previous embodiment of FIG. 1 except that the core control unit 6 includes the minimum I/O circuit 7.

Therefore, according to the embodiment of FIG. 6, beneficial effects similar to those of the embodiment of FIG. 1 are produced. Since the input and output circuits are built in the basic inverter section 100, input operations necessary for basic inverter control such as setting a frequency and giving a command for stopping the inverter can be performed even when no I/O block 200 is connected with the basic inverter section 100.

According to the present invention, among the processes performed by the microcomputer which controls the whole inverter system, the process required for control of the input/output interface and the process required for control of the main circuit of the inverter are separated from each other, and the I/O block is connected with the basic inverter section in use. Therefore, the specifications of the inverter system may be changed merely by selecting an I/O block without changing the basic inverter section, and hence various customer specifications may be satisfied easily.

What is claimed is:

1. An inverter apparatus comprising:

a basic control section including a main circuit, the main circuit including an inverter, and a control unit which controls the main circuit; and an I/O block which is connected to the basic control section, the I/O block being selected from a plurality of different types of I/O blocks, the I/O block including an input/output interface, the input/output interface including a signal connection terminal, the signal connection terminal transmitting an input/output signal to/from the control unit;

wherein operation management specifications of the main circuit are fixed independently of operation management specifications of the input/output interface;

wherein operation specifications of the inverter apparatus change depending on the operation management specifications of the input/output interface; and wherein the operation specifications of the inverter apparatus are determined by the type of the I/O block which is connected to the basic control section, such that connecting the different types of I/O blocks to the basic control section causes the inverter apparatus to have different operation specifications.

2. An inverter apparatus according to claim 1, wherein signal transmission between the basic control section and the I/O block is performed by serial communication.

3. An inverter apparatus according to claim 1, wherein the I/O block which is connected to the basic control section is constituted by a personal computer; and wherein signal transmission between the basic control section and the personal computer is performed by serial communication.

4. An inverter apparatus according to claim 1, wherein signal transmission between the I/O block and the basic control section is performed by serial communication;

wherein the inverter apparatus further comprises a minimum I/O circuit connected to the basic control section, the minimum I/O circuit transmitting a frequency specifying signal and an operation stop signal to the basic inverter control section; and wherein signal transmission between the minimum I/O circuit and the basic control section is performed by parallel communication.

5. An inverter apparatus according to claim 4, wherein the minimum I/O circuit is included in the basic control section.

6. An inverter apparatus according to claim 1, wherein the basic control section includes a microcomputer which controls the basic control section and which controls the input/output interface depending on the type of the I/O block which is connected to the basic control section.

7. An inverter apparatus comprising:

a basic control section which controls a main circuit of the inverter apparatus; and an I/O block which is connected via an input/output interface to the basic control section, the I/O block being selected from a plurality of different types of I/O blocks having different functions;

wherein operation specifications of the inverter apparatus are determined by the type of the I/O block which is connected via the input/output interface to the basic control section, such that connecting the different types of I/O blocks via the input/output interface to the basic control section causes the inverter apparatus to have different operation specifications.

8. An inverter apparatus according to claim 7, wherein signal transmission between the basic control section and the I/O block is performed by serial communication.

9. An inverter apparatus according to claim 7, wherein the I/O block is constituted by a personal computer; and wherein signal transmission between the basic control section and the personal computer is performed by serial communication.

10. An inverter apparatus according to claim 7, wherein signal transmission between the I/O block and the basic control section is performed by serial communication; and wherein the inverter apparatus further comprises a minimum I/O circuit connected to the basic control section, the minimum I/O circuit transmitting a frequency specifying signal and an operation stop signal to the basic inverter control section; and wherein signal transmission between the minimum I/O circuit and the basic control section is performed by parallel communication.

11. An inverter apparatus according to claim 10, wherein the minimum I/O circuit is included in the basic control section.

12. An inverter apparatus according to claim 7, wherein the basic control section includes a microcomputer which controls the basic control section and which manages the input/output interface depending on a type of the I/O block connected via the input/output interface with the basic control section.

* * * * *